United States Patent [19]
Ball

[11] Patent Number: 5,615,357
[45] Date of Patent: Mar. 25, 1997

[54] SYSTEM AND METHOD FOR VERIFYING PROCESSOR PERFORMANCE

[75] Inventor: Loran P. Ball, Sunnyvale, Calif.

[73] Assignee: Sun Microsystems, Inc., Mountain View, Calif.

[21] Appl. No.: 365,799

[22] Filed: Dec. 29, 1994

[51] Int. Cl.⁶ .................................................. G07C 5/08
[52] U.S. Cl. ................................................................ 395/500
[58] Field of Search ........................... 371/22.6; 364/500, 364/578; 395/500, 575, 481, 184.01

[56] References Cited

U.S. PATENT DOCUMENTS

| | | | |
|---|---|---|---|
| 4,500,993 | 2/1985 | Jacobson | 371/22.6 |
| 5,088,058 | 2/1992 | Salsburg | 364/500 |
| 5,146,586 | 9/1992 | Nakano | 395/575 |
| 5,446,876 | 8/1995 | Levine et al. | 395/184.01 |
| 5,448,713 | 9/1995 | Hamamoto | 395/481 |

OTHER PUBLICATIONS

Voith, Raymond, P.; "The Power PC™ 603 C++ Verilog™ Interface Model, Motorola MMTG Software Group"; pp. 337–340; IEEE; 1994.

Lauterbach, Gary, "Accelerating Architectural Simulation by Parallel Execution of Trace Samples", pp. 1–13, Sun Microsystems Laboratories, Inc., Dec. 1993.

Cmelik, Bob, Keppel, David, "Shade: A Fast Instruction–Set Simulator for Execution Profiling", pp. 128–137, Sigmetrics, Santa Clara, 1994.

Poursepanj, Ali, Ogden, Deene, Burgess, Brad, Sonya, Gary, Dietz, Carl, Lee, David, Sutya, S., Peters, Mike, "The Power PC™ 603 Microprocessor: Performance Analysis and Design Trade–offs", pp. 316–323, Motorola, Inc., Austin, TX, 1994.

*Primary Examiner*—Kevin J. Teska
*Assistant Examiner*—Dan Fiul
*Attorney, Agent, or Firm*—Hickman Beyer & Weaver

[57] ABSTRACT

A method of adapting execution-driven simulators to accept traces is provided. First, a benchmark program is executed to provide a trace file of the executed instructions. Each output instruction of the trace file includes the program counter (PC) and the op code of the instruction executed. In addition for memory access instructions, the trace file includes effective memory addresses, and for decision control transfer instructions, the trace file includes actual branch destinations. Next, the trace file is randomly sampled to produce relatively small segments of contiguous trace instructions. These are then provided to a processor model which processes them concurrently with the benchmark program which is provided in a memory model connected to the processor model. To ensure that the processor design performance is accurately predicted, the trace file effective addresses are used during execution. After each instruction in the trace file has been processed, the processor performance statistics such as average cycles per instruction and cache hit rate are provided.

22 Claims, 14 Drawing Sheets

| | 1 | 2 | 3 | 4 | 5 | 6 | 7 | 8 | 9 | 10 | 11 | CYCLES |
|---|---|---|---|---|---|---|---|---|---|---|---|---|
| ADD | F | D | G | E | C | $N_1$ | $N_2$ | $N_3$ | W | | | |
| LOAD | F | D | G | E | C | $N_1$ | $N_2$ | $N_3$ | W | | | |
| FADD | F | D | G | E | C | $N_1$ | $N_2$ | $N_3$ | W | | | |
| ADD | | F | D | G | E | C | $N_1$ | $N_2$ | $N_3$ | W | | |
| OR | | F | D | G | E | C | $N_1$ | $N_2$ | $N_3$ | W | | |
| CALL | | F | D | G | E | C | $N_1$ | $N_2$ | $N_3$ | W | | |
| NOP | | F | D | G | E | C | $N_1$ | $N_2$ | $N_3$ | W | | |

FIG. 3B

| PC  | STATIC PROGRAM |
|-----|----------------|
| 10: | ADD (% L0, % L1, % L2) |
| 14: | BRANCH IF L2 > 0 TO 22 |
| 18: | CALL       200 |
| 22: | NOP |
| 26: | LOAD MEM [ % L 0] % L1 |

FIG. 4A

| PC  | TRACE FILE |
|-----|------------|
| 10: | 32 BIT INSTRUCTION WORD ( "IW" ) |
| 14: | IW, BRANCH DESTINATION |
| 22: | IW |
| 26: | IW, EFFECTIVE MEMORY ADDRESS |

FIG. 4B

TRACE BUFFER

SIMULATOR INSTRUCTION STRUCTURE

SYSTEM AND METHOD FOR VERIFYING PROCESSOR PERFORMANCE

BACKGROUND OF THE INVENTION

The present invention relates to cycle accurate simulators for use in predicting the performance of processor designs. More particularly, the present invention relates to processor models that can run in a trace driven mode to determine a processor design's performance in a relatively short period of time.

During the development of microprocessors, various designs are proposed and modified. Each design is tested for bugs and for performance (i.e., speed), and modified accordingly to remove bugs and/or improve performance. Ultimately, a design is deemed sufficiently bug-free and fast to be frozen and converted to hardware.

Various software representations of the processor are employed during development. Most importantly, a logical representation of the processor is provided in a hardware design language ("HDL") such as Verilog. This representation is, in fact, an inchoate description of the processor hardware. Ultimately, when the processor design is frozen, the HDL representation is converted to an arrangement of gates capable of implementing the processor logic on a semiconductor chip.

Other software representations of the processor are used to evaluate the performance of HDL designs. One such model is an "architectural model" which contains a relatively high level description of the processor's architecture. Architectural models are commonly used to run standard "benchmark" programs designed to objectively measure the performance of processors. The measures of performance provided by running benchmark programs include, for example, the average number of cycles required to execute an instruction, the rate at which the data cache is accessed, and other performance statistics. Not surprisingly, architectural models are frequently employed during the design process to determine how a particular change to the processor (made to the HDL model) will effect performance. In addition, the performance statistics generated by architectural models may be supplied to potential customers long before the processor design is actually converted to hardware.

While architectural models can run benchmark programs relatively fast, they do not necessarily give highly accurate performance predictions. Modern processors contain many complexities and nuances that can not be completely and accurately modeled by very high level representations such as architectural models. For example, many processors—such as those developed according to the SPARC V9 microprocessor specification—contain branch prediction algorithms, instruction grouping logic for superscalar pipelining, LOAD/STORE cache access rules, etc. that may not modeled with complete accuracy in an architectural model. See "The SPARC Architecture Manual" Version 9, D. Weaver and T. Germond, Editors., Prentice-Hall, Inc., Englewood Cliffs, N. J. (1994), which is incorporated herein by reference for all purposes. Other microprocessor designs may have these and/or other complexities that can not be modeled with complete accuracy by architectural models. Thus, it has been difficult to predict processor performance with very good accuracy during development.

One of the basic shortcomings of architectural models is their inability to accurately model the cycle-by-cycle performance of the processor. Another type of processor model, a "cycle accurate model," contains a sufficiently detailed representation of the processor to maintain cycle-by-cycle correspondence with the actual processor. One such cycle accurate model is described in Poursepan, "The Power PC 603 Microprocessor: Performance, Analysis and Design Tradeoffs", spring Compcon 94, pp. 316–323, IEEE Computer Society Press, 1994. Cycle accurate models find wide use in identifying bugs during processor design verification. For this function, a test sequence of assembly language code is executed on both the HDL representation and the cycle accurate representation of the processor. If any discrepancies are detected in how the two representations handle the test sequence, a bug has likely been found and the HDL representation is accordingly modified to remove the bug.

Cycle accurate models could, in theory, provide an accurate prediction of a processor design's performance by running benchmark programs, but, unfortunately, they are much too slow to run an entire benchmark program (which may require executing several million instructions). Further, cycle accurate models can not provide the resources of an operating system, which are needed to run a benchmark program.

Thus, there exists a need for a processor model that provides accurate performance statistics when running a benchmark program in a reasonably short period of time.

SUMMARY OF THE INVENTION

The present invention provides methods and systems for accurately determining the performance of processor designs by using execution-driven simulators adapted to run in a trace driven mode. The system of this invention includes an execution-driven model of a processor's CPU, a trace buffer for providing trace instructions to the CPU, and a model of memory (e.g., a model of RAM) for providing executable instructions to the CPU. A "trace" is provided by executing a program, such as a benchmark program, on a tool that outputs a list of the instructions performed (the "trace"). Each output instruction of the "trace" includes the program counter ("PC") and op code of the instruction executed, and, for certain classes of instructions, an effective address. Preferably, these classes of instructions are (1) LOAD and STORE instructions (i.e., memory access instructions), in which case the effective addresses are memory locations, and (2) decision control transfer instructions ("DCTIs"), in which case the effective addresses are branch destinations. Those instructions that do not require memory access or branching will not include an effective address.

Before a simulator is used in accordance with this invention, the complete listing of executed instructions (the "trace file") is randomly sampled to produce relatively small segments of contiguous trace instructions. These segments are then provided to the model of the CPU—through the trace buffer—which processes them concurrently with corresponding executable instructions from the memory model. The executable instructions in the model memory will be a static version of the program used to generate the trace file (e.g., a benchmark program).

To initialize the procedure, the PC of the first instruction in the trace file segment is identified and the instruction in the model memory having the same PC is fetched by the CPU model. Thereafter, the CPU model fetches each successive instruction in the model memory as if it was actually executing the program. Each time the model fetches a new instruction, it also inputs the next sequential trace instruction from the trace buffer. When the corresponding trace file instruction has an effective address, the model of the CPU usually uses this effective address to execute the instruction, and will not itself calculate the effective address as it would in an execution driven mode. By relying on the trace file to supply effective addresses, the model CPU need not maintain an accurate representation of the processor architectural state (which is not available anyway when starting with a random trace instruction), but can nevertheless process instructions in the same manner as would be required if the actual architectural state was available. After each instruction in the trace file has been processed, the processor performance statistics such as the average number of cycles per instruction and the cache hit rate are output.

This trace driven application of an execution-driven model can generate accurate performance statistics for a processor design in a fraction of the time required to execute an entire benchmark program. Because only a small fraction of the benchmark program is executed (as determined by the size of the trace file segment), only a fraction of the time normally required to execute the benchmark is required. The number of cycles required to execute a portion of the benchmark is accurately tallied because the trace file provides the effective addresses of performance critical instructions such as memory access instructions and decision control transfer instructions.

Another way of describing the present invention is as a system for predicting the performance of a processor including the following elements: (1) a CPU model capable of executing a sequence of program instructions in the same number of cycles as the processor itself; (2) a memory model accessible by the CPU model for storing a static version of the sequence of program instructions which can be executed on the CPU model; and (3) a trace buffer for inputting into the CPU model trace file instructions containing effective addresses for defined classes of instructions such as memory access instructions and DCTIs. In this system, the CPU model concurrently processes corresponding instructions from the trace buffer and from the static version of the sequence of program instructions. The trace file instructions are used to determine the effective addresses of memory access instructions and DCTIs encountered by the CPU model.

In preferred embodiments, the CPU model is a cycle accurate model composed of software objects such as C++ objects which represent the main CPU elements (e.g., an integer execution unit, a load and store unit, etc.). The objects are designed to accurately model the processor's instruction pipeline (such as a superscalar pipeline). When an instruction is fetched from memory, the CPU model creates an instruction structure containing fields for various pieces of information that are provided as the instruction proceeds through the pipeline. Examples of instruction structure fields include a program counter for the instruction fetched from the memory model, a program counter for the concurrently processed trace file instruction, and a flag indicating whether the instruction structure is annotated with an effective address from the trace file instruction.

Another aspect of the invention is a computer implemented method for providing performance criteria for a processor design with the aid of a CPU model capable of operating in execution-driven and trace-driven modes. The method includes the following steps: (1) providing a segment of a trace file of a program which was previously executed to generate the trace file; (2) providing a static version of the program used to generate the trace file in a model of a main memory; and (3) concurrently processing, in the CPU model, instructions from the segment of the trace file and from the static version of the program, such that the CPU model determines at least some effective addresses from the segment of the trace file without itself calculating the effective addresses. Preferably, the CPU model compares the static and trace file program counters for each successive instruction, and then annotates an instruction structure with the effective address specified by the trace file segment when (a) the static and trace file program counters agree, and (b) the instruction is a memory access or a decision control transfer instruction.

In preferred embodiments, the following steps are performed each time a DCTI is encountered: (a) predicting a branch target according to a branch prediction algorithm of the processor design; (b) comparing the predicted branch target with an actual branch target (typically supplied as an effective address in the trace instruction) to determine if the CPU model has taken an incorrectly predicted path; and (c) if the actual and predicted branch targets do not agree (i.e., an incorrectly predicted path is encountered), invalidating instructions on the incorrectly predicted path. In addition, the method preferably includes a step of checking for traps and, if a trap meeting defined criteria is found, invalidating the trap instruction and one or more other instructions following the trap instruction in a pipeline. Because some instructions are invalidated (for being on an incorrectly predicted path or entering a trap) during normal execution in hardware processors, an accurate prediction of performance requires that the simulators of this invention accurately account for invalidated instructions—as described.

These and other features of the present invention will be presented in more detail in the following specification of the invention and the figures.

BRIEF DESCRIPTION OF THE DRAWINGS

FIG. 3B is a table detailing how a superscalar processor can pipeline instructions;

FIG. 4A is a representation of a sequence of assembly language instructions provided as part of a benchmark program;

FIG. 4B is a representation of a sequence of output lines from a trace file produced by executing the benchmark program depicted in FIG. 4A;

DESCRIPTION OF THE PREFERRED
EMBODIMENTS

1. Physical Embodiment

The invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, instruction structures, or the like. It should be remembered, however, that all of these and similar terms are to be associated with the appropriate physical quantities and are merely convenient labels applied to these quantities.

Further, the manipulations performed are often referred to in terms, such as comparing, executing, or predicting. In any of the operations described herein that form part of the present invention, these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given below.

Figure 1:
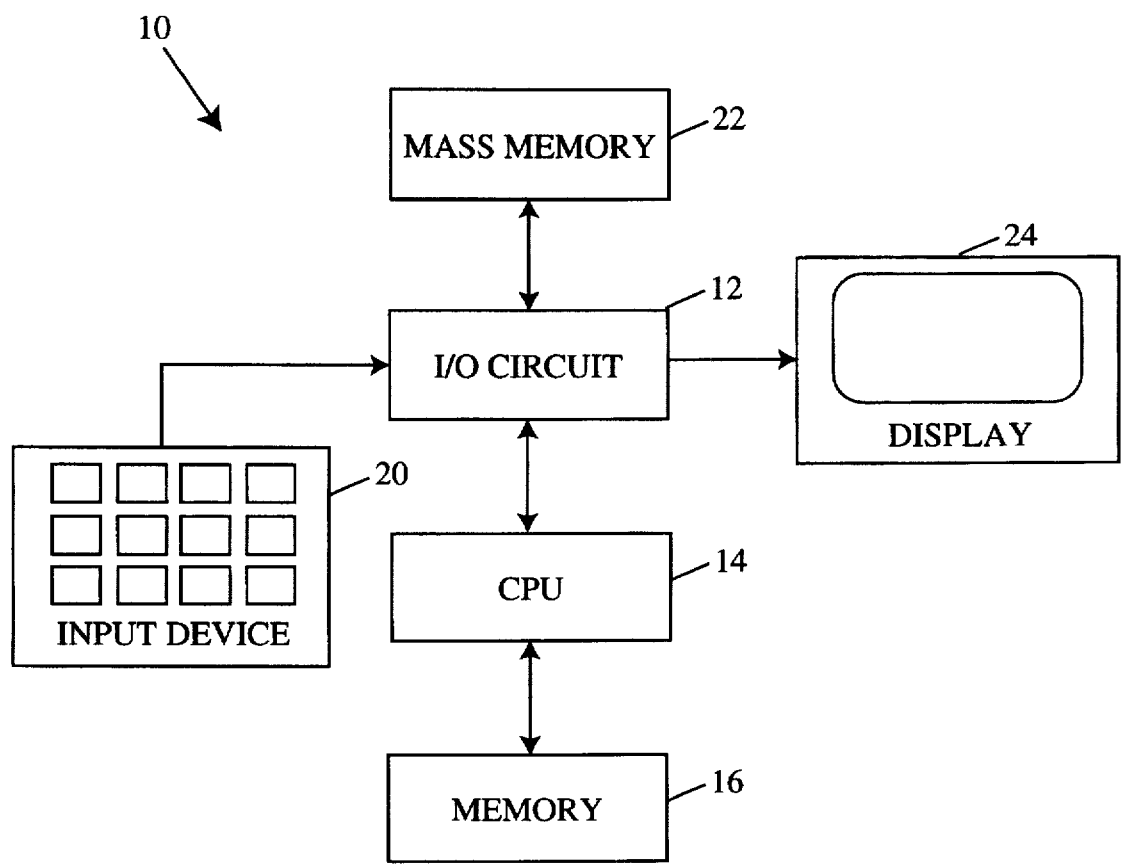
FIG. 1 is a block diagram of a computer system which may used to run a simulator of the present invention.

FIG. 1 shows a typical computer-based system according to the present invention. Shown is a computer 10 which comprises an input/output circuit 12 used to communicate information in appropriately structured form to and from the parts of computer 10 and associated equipment, a central processing unit 14, and a memory 16. These components are those typically found in most general and special purpose computers 10 and are intended to be representative of this broad category of data processors.

FIG. 1 also illustrates an input device 20 shown as a keyboard. It should be understood, however, that the input device 20 may actually be a transducer card reader, a magnetic or paper tape reader, a tablet and stylus, a voice or handwriting recognizer, or some other well-known input device such as, of course, another computer. A mass memory device 22 is coupled to the input/output circuit 12 and provides additional storage capability for the computer 10. The mass memory device 22 may be used to store programs, data, instruction structures, and the like and may take the form of a magnetic or paper tape reader or some other well known device. It will be appreciated that the information retained within the mass memory device 22, may, in appropriate cases, be incorporated in standard fashion into computer 10 as part of the memory 16.

In additional, a display monitor 24 is illustrated which is used to display the images being generated by the present invention. Such a display monitor 24 may take the form of any of several well-known varieties of cathode ray tube displays, flat panel displays, or some other well known type of display.

As is well-known, the memory 16 may store programs or objects which represent a variety of sequences of instructions for execution by the central processing unit 14. For example, the objects making up a cycle accurate model of this invention may be stored within the memory 16.

Preferred embodiments of the present invention employ various "objects" such as "C++" objects. As is well known to software developers, an "object" is a logical software unit containing both data and a collection of related processes which give it capabilities and attributes. For example, an object can represent a functional block within a processor such as a "load and store unit" which may have a "cache" of a defined size. Objects can contain other objects and can have a variety of relationships with other objects as is known in the art. Object oriented programming views a computer program as a collection of largely autonomous components, each of which is responsible for a particular task. There are many widely-used texts which describe object oriented programming. See, for example, Lippman, "C ++Primer" 2d ed., Addison-Wesley, Menlo Park, Calif. (1991) which is incorporated herein by reference for all purposes.

2. Structure and Use of Trace Driven Cycle Accurate Models

Figure 2:
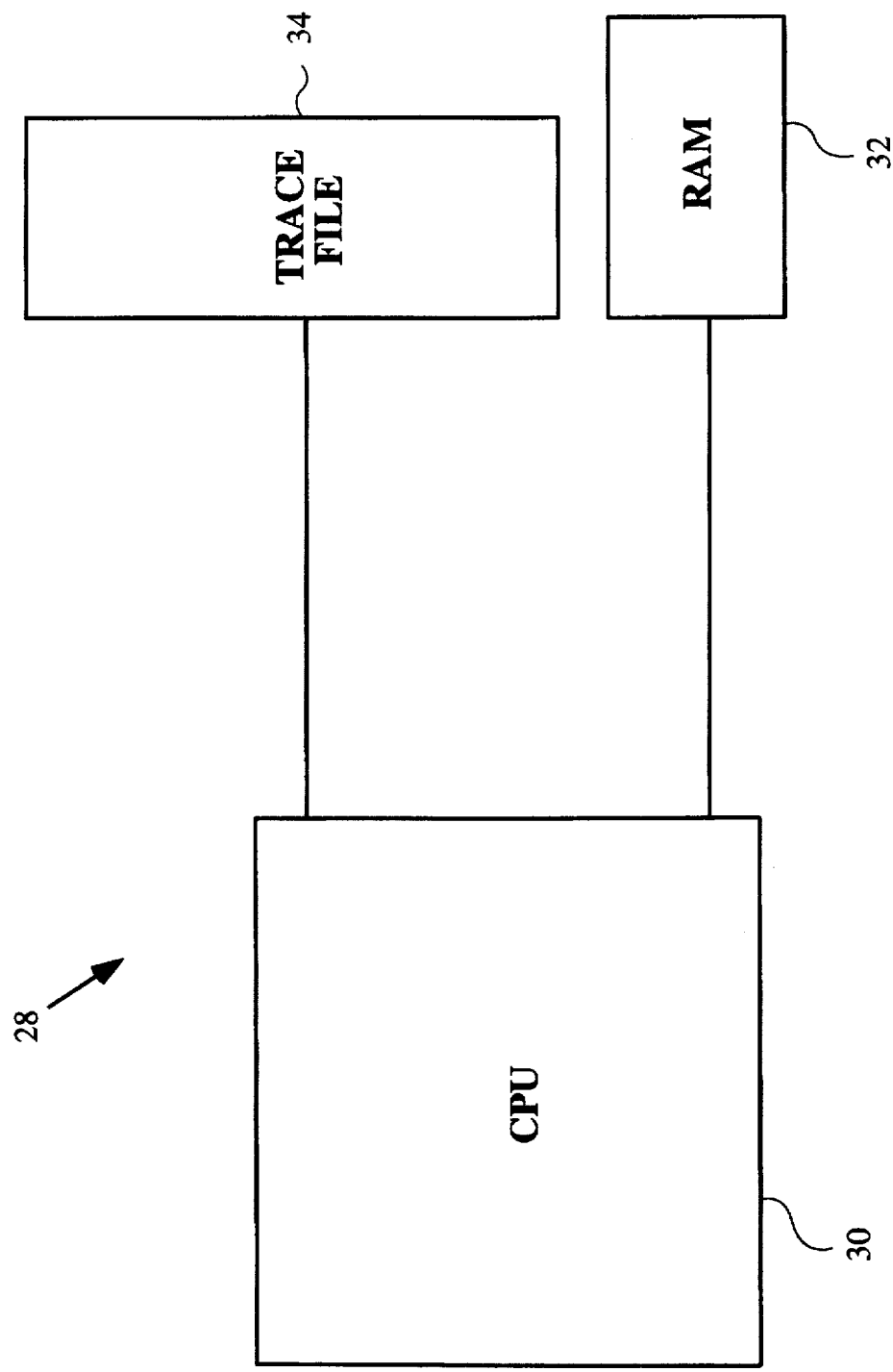
FIG. 2 is a block diagram illustrating the three main components (a CPU model, a RAM model, and a trace file) of a simulator in accordance with the present invention.

FIG. 2 is a block diagram of the main elements contained in a simulator 28 of this invention. Included in the simulator is a simulated CPU 30 which may receive instructions from two different sources, a Random Access Memory ("RAM") 32 and a trace file 43. In preferred embodiments, the instructions in trace file 34 are made available at CPU 30 through a trace buffer, not shown. Previous execution-driven simulators provided only CPU and RAM models, without any mechanism for accessing a trace file. In such models, assembly language instructions are stored in the model RAM and executed sequentially on the model CPU. As noted, there is no mechanism in such models for executing higher level instructions which require the resources of a particular operating system such as UNIX or DOS.

Preferably, CPU 30 is a cycle accurate model of an actual hardware processor or an HDL representation of a processor. However, it may more generally be any execution-driven processor model such as an instruction accurate model. It is assumed that during development of a processor, all changes to the HDL representation are reflected in the CPU model so that CPU 30 will provide a realistic representation of the actual hardware processor at any given stage of development.

Figure 3A:
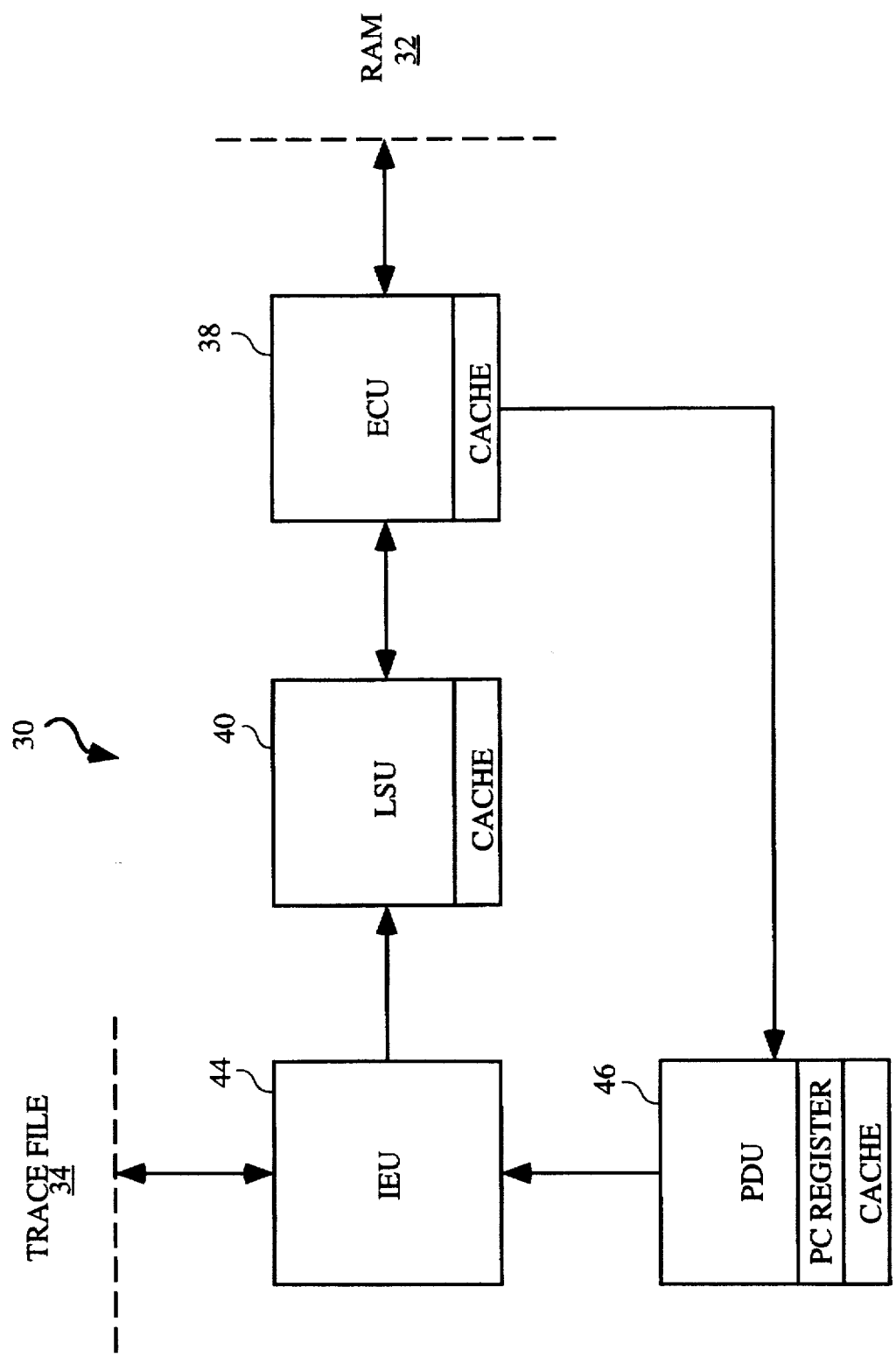
FIG. 3A is a block diagram showing four major units of a CPU model employed in a simulator of the present invention.

FIG. 3A illustrates some details of an exemplary CPU design such as, for example, a SPARC chip available from Sun Microsystems, Inc., Mountain View, Calif. The CPU 30 includes an external cache unit ("ECU") 38, a prefetch and dispatch unit ("PDU") 46, an integer execution unit ("IEU") 44, and a LOAD/STORE unit ("LSU") 40. In preferred embodiments, each of these CPU units are implemented as software objects such as C++ objects, and the instructions delivered between the various objects representing the units of CPU 30 are provided as packets containing such information as the address of an instruction, the actual instruction word, etc. By endowing the objects with the functional attributes of actual CPU elements, the model can provide cycle-by-cycle correspondence with the HDL representation. As explained above, this feature is not available with architectural models.

In the simulator of FIG. 3A, RAM 32 stores a static version of a program (e.g. a benchmark program) to be executed on CPU 30. The instructions in RAM 32 are provided to CPU 30 through an external cache unit 38 which may contain, for example, about 1–4 megabytes of storage. The instructions stored in ECU 38 are available to both PDU 46 and a LSU 40. As new instructions are to be executed, they are first provided to PDU 46 from external cache unit 38. PDU 46 then provides an instruction stream to IEU 44 which is responsible for executing the logical instructions presented to it. LOAD or STORE instructions (which cause load and store operations to and from memory) are forwarded to LSU 40 from IEU 44. The LSU 40 may then make specific LOAD/STORE requests to ECU 38.

The IEU 44 receives previously executed instructions from trace file 34. As noted, some trace file instructions contain information such as the effective memory address of a LOAD or STORE operation and the outcome of decision control transfer instruction ("DCTI," i.e., a branch instruction) during a previous execution of a benchmark program. In prior art cycle accurate models, this information is obtained only by actually executing the program from start to finish. In this invention, however, the program can be executed in segments carved from the trace file. Because the trace file specifies effective addresses for LOAD/STORE and DCTI instructions, the IEU—which normally calculates effective addresses during execution—must be adapted to defer to the trace file instructions. This mechanism will be described in more detail below.

The objects of the simulator must accurately model the instruction pipeline of the processor design it represents. FIG. 3B presents an exemplary cycle-by-cycle description of how seven sequential assembly language instructions might be treated in a superscalar processor which can be appropriately modeled by a Simulator of this invention. The various pipeline stages, each treated in a separate cycle, are depicted in the columns of FIG. 3B. The PDU handles the fetch ("F") and decode ("D") stages. Thereafter, the IEU handles the remaining stages which include application of the grouping logic ("G"), execution of Boolean arithmetic operations ("E"), cache access for LOAD/STORE instructions ("C"), execution of floating point operations (three cycles represented by "$N_1$–$N_3$"), and insertion of values into the appropriate register files ("W"). Among the functions of the execute stage is calculation of effective addresses for LOAD/STORE instructions. Among the functions of the cache access stage is determination if data for the LOAD/STORE instruction is already in the external cache unit.

In a superscalar architecture, multiple instructions can be fetched, decoded, etc. in a single cycle. The exact number of instructions simultaneously processed will be a function of the maximum capacity of pipeline as well as the "grouping logic" of the processor. In general, the grouping logic controls how many instructions (typically between 0 and 4) can be simultaneously dispatched by the IEU. Basically, grouping logic rules can be divided into two types: (1) data dependencies, and, (2) resource dependencies. The "resource" here refers to a resource available on the microprocessor. For example, the microprocessor may have two arithmetic logic units (ALUs). If more than two instructions requiring use of the ALUs are simultaneously presented to the pipeline, the appropriate resource grouping rule will prevent the additional arithmetic instruction from being submitted to the microprocessor pipeline. In this case, the grouping logic has caused less than the maximum number of instructions to be processed simultaneously. An example of a data dependency rule is as follows. If one instruction writes to a particular register, no other instruction which accesses that register (by reading or writing) may be processed in the same group.

In this example, the first three instructions, ADD, LOAD and FADD (floating point add), are simultaneously processed in a superscalar pipeline. The next successive instruction, an ADD instruction, is not processed with the proceeding three instructions because, for example, the processor has the capacity to treat only two ADD (or FADD) instructions in a single cycle. Thus, the second ADD instruction (the fourth overall instruction) is processed with the next group of instructions: ADD, OR, CALL and NOP.

As noted above, cycle accurate models generally provide a very accurate representation of a processors performance, but execute too slowly to be of practical use in running benchmark programs. The present invention improves upon conventional cycle accurate models by allowing them to run in trace-driven mode. In this mode, the trace file of a previously executed benchmark program is sampled (i.e., divided into relatively small fragments) and used to assist the cycle accurate model 30 in executing relatively small dynamic portions of a benchmark program. By running such small portions, performance statistics normally obtained by completely executing a benchmark program can be obtained in a relatively short time.

FIGS. 4A and 4B compare a static program segment (FIG. 4A) as it might appear in a benchmark program and a corresponding trace file segment (FIG. 4B) generated during execution of the static program. In FIG. 4A, each line of the static program includes a program counter followed by a colon and then a representation of an assembly language instruction. For example at PC 10, the op code for an "ADD" instruction is provided together with three operands, 10, 11, and 12, designating three processor registers. Next, at PC 14, a conditional branch is specified in which the branch is taken if the current value in register 12 is greater than 0. Subsequent instructions include a "CALL" instruction at PC 18, a "no operation" instruction at PC 22, and a "LOAD" at PC 26. Of course, the actual program will include many instructions in addition to the five instructions depicted in FIG. 4A.

FIG. 4B shows a segment of a trace file provided upon execution of the sequence of instructions shown in FIG. 4A.

Trace files are typically used for debugging purposes to show the "trace" taken during execution of a static program. Of course, a given segment of a static program (e.g., that shown in FIG. 4A) may be executed many times during a single run of the program (due to looping). Thus, the instructions appearing in a trace file segment may actually be reproduced many times in the complete trace file. Trace files suitable for use with this invention will include the program counter of the instruction executed, a binary instruction word ("iw"), and, for some instructions, an effective address. As noted, in preferred embodiments, the effective address is only provided in the case of LOAD/STORE and branch instructions. For LOAD/STORE instructions, the effective address is the effective memory address of the LOAD or STORE operation. For branch instructions, the effective address is the branch destination (noted as a PC).

Of course, the sequence of instructions in the trace file will not necessarily parallel those in the static program representation. This is because branch instructions may cause the processor to jump to another location in the program that does not sequentially follow from the location of the branch instruction. As shown in the example presented in FIGS. 4A and 4B, the branch instruction at PC 14 is taken so that the processor jumps ahead to PC 22 during execution, skipping PC 18.

Figure 5A:
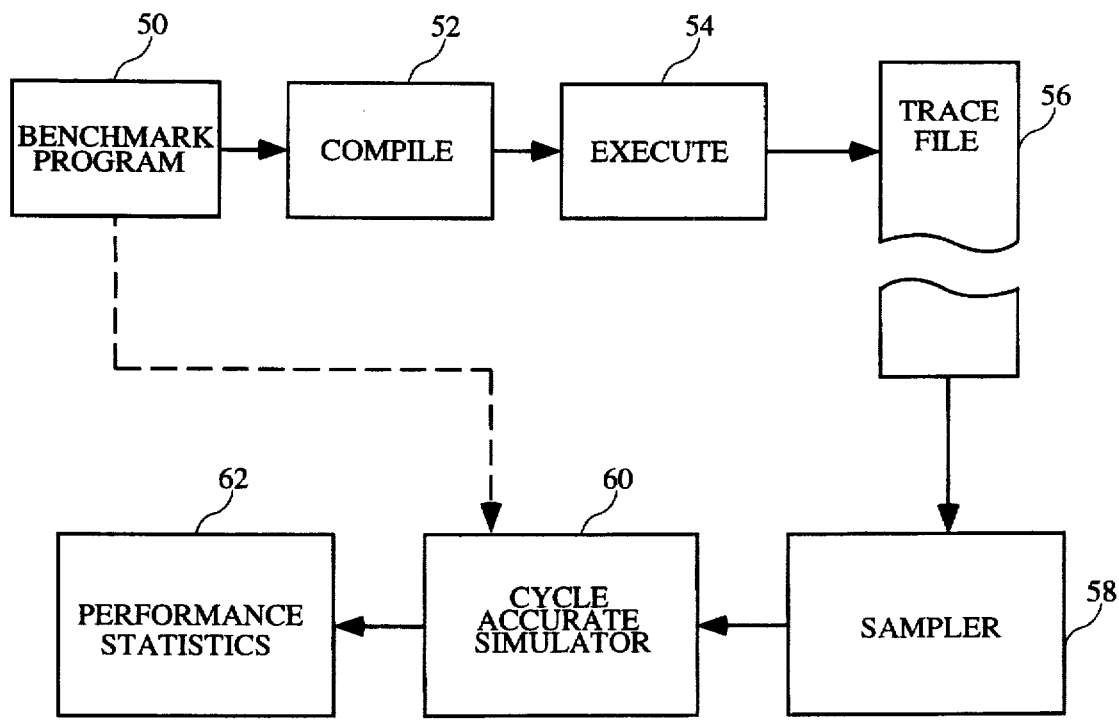
FIG. 5A is a block diagram illustrating the overall process by which a simulator of this invention uses a benchmark program to generate performance statistics for a processor design.

FIG. 5A presents, in block form, the sequence of events by which a simulator of this invention employs a benchmark program to generate performance statistics. Initially, a static benchmark program 50 is compiled at a step 52 to produce a machine language version of the program which is executed at a step 54. The benchmark program 50 is executed on a tool such as a fast instruction accurate processor model in such a manner that it generates a trace file 56 containing the information such as that shown in FIG. 4B. Suitable tools for this purpose are described in Cmelik et al., "Shade: A fast Instruction-set simulator for Execution Profiling," Sigmetrics 94, pp. 128–137 (May 1994) which is incorporated herein by reference for all purposes. For a conventional benchmark program, the trace file might contain on average about 20 million instructions. To perform this many instructions in a cycle accurate model would take a prohibitively long period of time, as explained above. Thus, in accordance with this invention, the trace file 56 is chopped into a number of small segments by a sampler 58. Thereafter, the trace file samples are provided to a cycle accurate simulator 60 which uses the information contained in the traces, in conjunction with static benchmark program 50, to generate a collection of performance statistics 62. The process by which cycle accurate model 60 "executes" the trace file samples will be described in more detail below in conjunction with FIGS. 6A–6G. Exemplary performance statistics include the total number of cycles required to execute a benchmark, the average number of cycles to execute an instruction in the benchmark, the number of times that cache was accessed, etc.

Figure 5B:
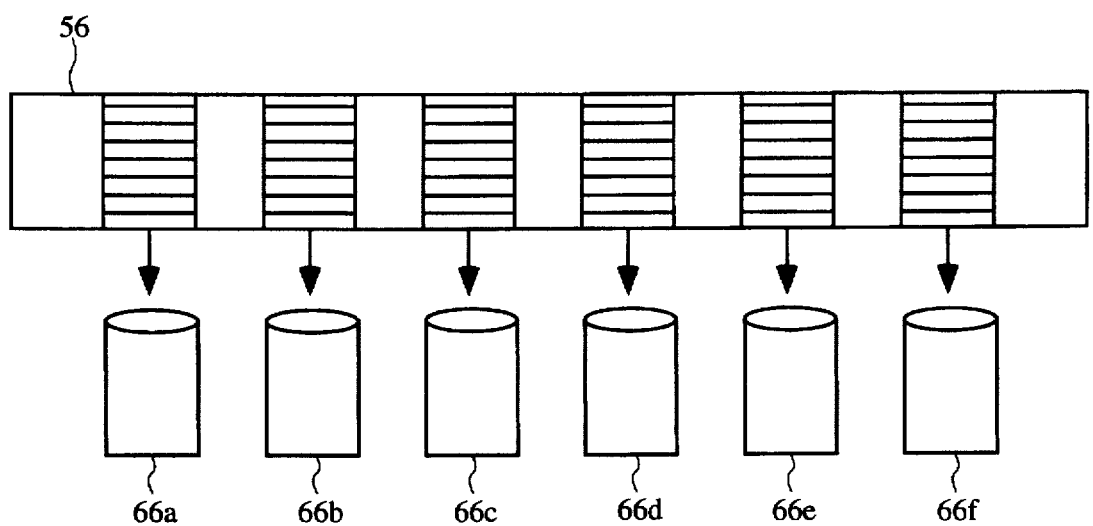
FIG. 5B is a representation of a trace file divided into segments which are used by a simulator of this invention to generate performance statistics.

FIG. 5B illustrates the conversion of the complete trace file 56 into a number of sample traces 66a–66f. The sampler 58 typically carves out about 0.3% of the total trace file into a number of trace segments or samples. Each such trace segments includes a series of contiguous executed instructions from the trace file. These are then employed by the cycle accurate simulator 60, one at a time, to generate performance statistics 62 without being required to execute the entire benchmark program 50.

Typically, about 20 benchmark programs are used to ascertain the performance of a processor design. Each of these is complied and executed as explained above to generate it own trace file. Each resulting trace file is then sampled to produce about 200 individual traces, for a total of about 400 traces to be run on cycle accurate model 60. Each trace segment contains in the neighborhood of 60,000 instructions.

3. The Process of Running a Simulator in Trace Mode

Figure 6A:
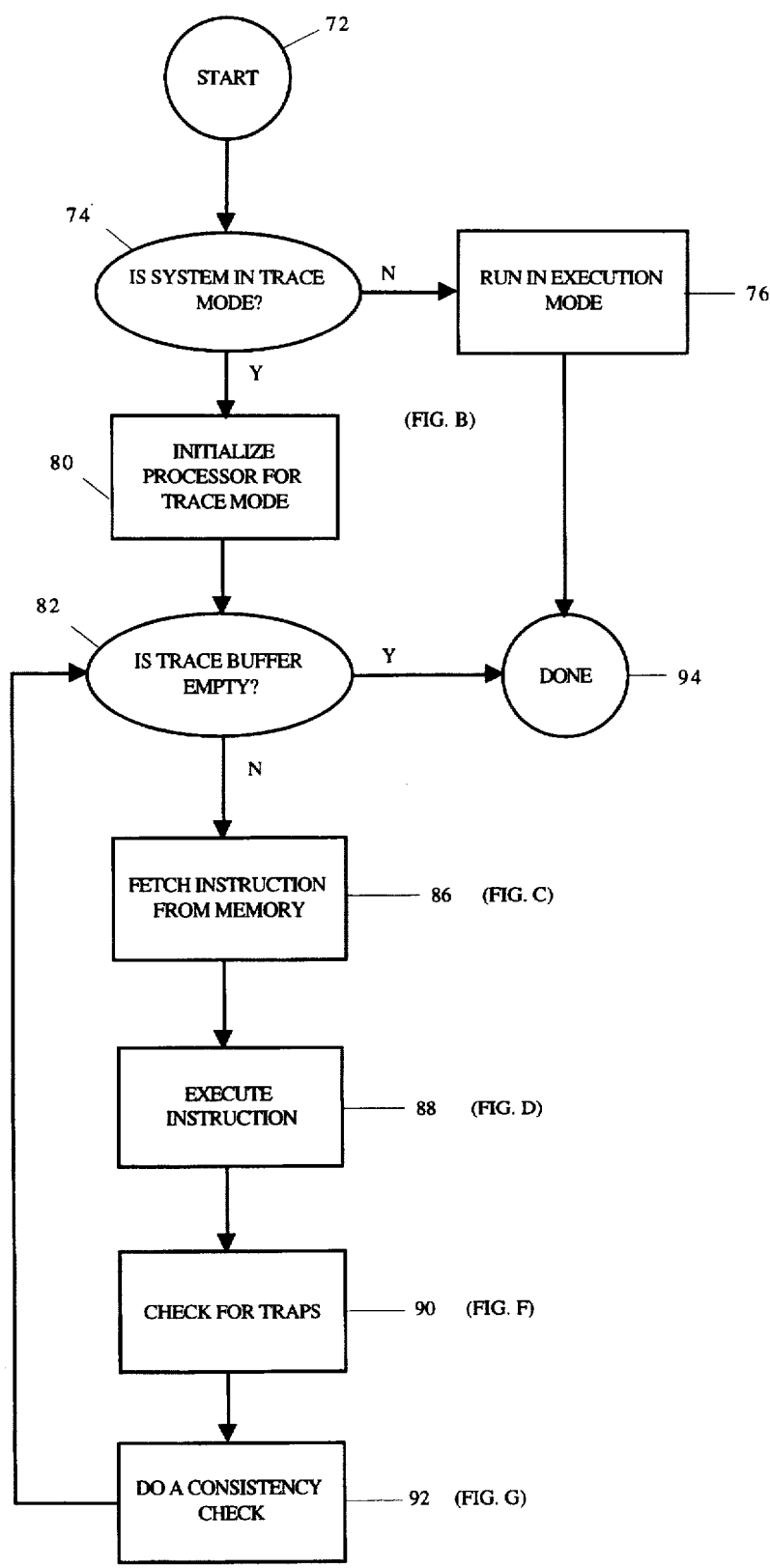
FIG. 6A is a process flow diagram depicting the overall sequence of operations performed by a simulator in accordance with this invention.

The process employed in a preferred embodiment of the present invention will now be described with reference to FIGS. 6A–6G. At a general level, the process is depicted in FIG. 6A. The process begins at 72 and in a step 74 determines whether the simulator is in a trace driven mode. In preferred embodiments, the simulator will be able to operate in either execution mode or trace driven mode. When in trace driven mode, the integer execution unit will normally defer to the trace file when determining the effective address of an instruction. In execution mode, the simulator will calculate an effective address just an in a hardware processor. If decision step 74 determines that the simulator is in execution mode, the simulator will run in execution mode as indicated in a step 76. Thereafter, the process is completed at 94. As execution mode is not of particular relevance to this invention, step 76 will not be discussed further except for purposes of comparison.

Assuming that decision step 74 is answered in the affirmative, a process step 80 initializes the processor for trace mode. This step will be discussed in more detail with reference to FIG. 6B. Next, a decision step 82 determines whether the trace buffer is empty. A trace buffer is a section of memory allocated to hold one or a few instructions from the trace file before they are fed to the cycle accurate model of the CPU 30. Assuming that the trace buffer is not empty, a process step 86 fetches the next appropriate instruction from memory. It should be understood that this memory corresponds to RAM 32 of cycle accurate simulator 28. Step 86 will be discussed in more detail with reference to FIG. 6C. Next, a process step 88 executes the instruction fetched at step 86. Step 88 will be discussed in more detail with reference to FIG. 6D.

Thereafter, a step 90 checks for traps in the cycle accurate model of the CPU. Step 90 will be discussed in more detail with reference to FIG. 6F. Finally, a step 92 performs a consistency check of the simulator's treatment of the current instruction. Step 92 will be discussed more detail with reference to FIG. 6G. After step 92 has been completed, process control returns to decision step 82 which again checks to determine whether the trace buffer is empty. The process continues to loop through steps 82–92—once for each instruction. Ultimately, the last instruction from a trace file segment will be employed in the process, and the trace buffer will be empty. At that point the process is completed at 94.

It should be understood that process steps 86 and 88 represent the passage of a single instruction through a pipeline such as that depicted in FIG. 3B. Therefore, the loop shown in FIG. 6A (steps 82, 86, 88, 90, and 92) is executed in parallel for each new instruction fed to pipeline. That is, after an instruction has been fetched from RAM at step 86 and moves down the pipeline toward step 88, a fresh instruction is fetched from RAM at step 86. At any given instance in time, there are multiple processes of the type depicted in FIG. 6A being performed, one for each instruction in a pipeline.

Figure 6B:
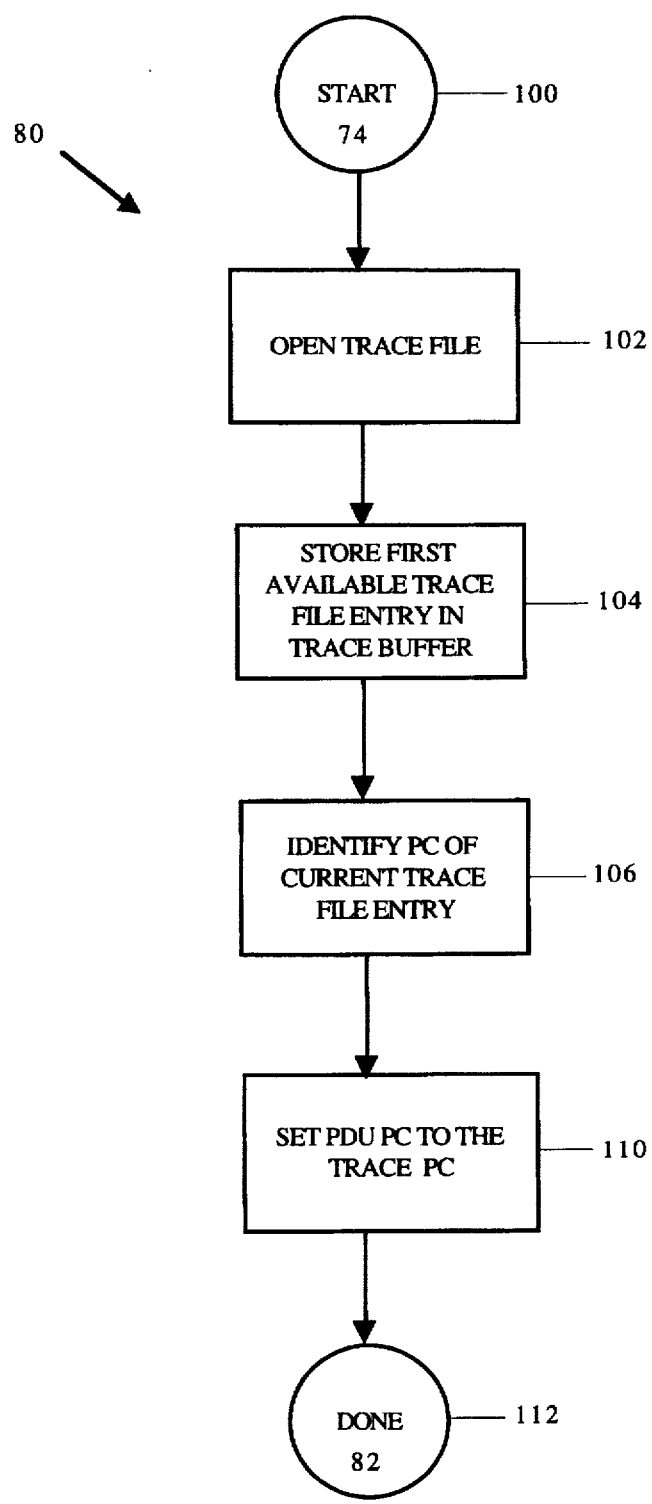
FIG. 6B is a process flow diagram depicting how a simulator of this invention can be initialized for trace mode.

FIG. 6B is a process flow diagram detailing the step of initializing a processor for trace mode (step 80 of FIG. 6A). The process begins at 100 and, in a process step 102, the trace file is opened. Thereafter, the first available trace file entry is stored in the trace buffer at a step 104. Next, the PC of the first trace file entry in the trace buffer is identified at step 106. This step is necessary so that the PDU knows which instruction to fetch from RAM at the beginning of the process. Because the trace file has been divided into segments, the PC at which trace driven execution begins will be unknown until the first entry from the trace file is placed in the trace buffer. After the first trace instruction PC has been extracted, the process of initializing the processor is completed by setting the PDU PC to the trace PC at step 110 and exiting at 112. As discussed below, the PDU PC is maintained for two purposes: (1) to determine which instruction to next fetch from RAM, and (2) to determine if a branch was incorrectly predicted (comparing the PDU PC with the corresponding trace entry PC).

Figure 6C:
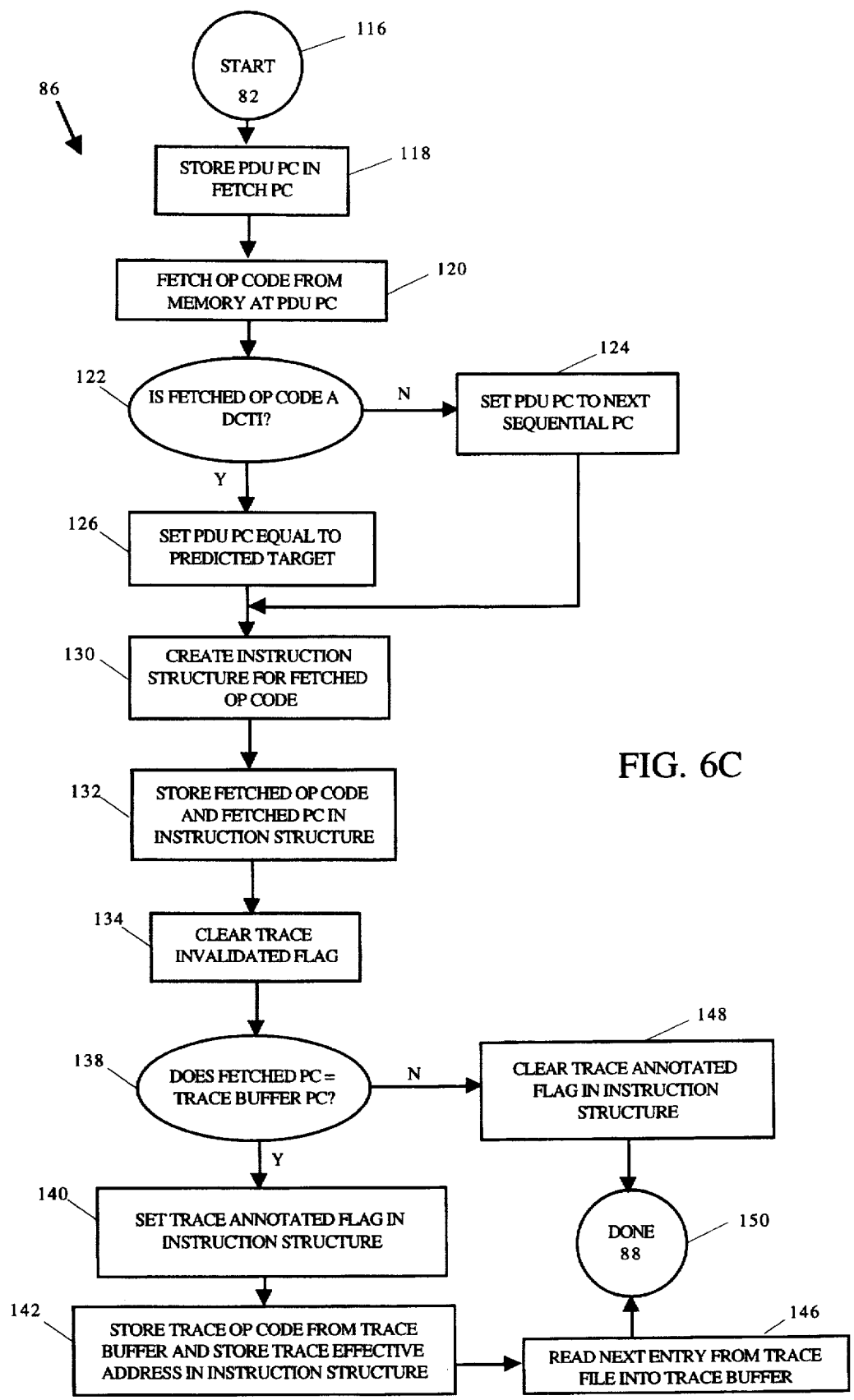
FIG. 6C is a process flow diagram detailing the process by which instructions are fetched from memory in accordance with the present invention.

FIG. 6C details the process by which the PDU fetches an instruction from memory (step 86 of FIG. 6A). The process begins at 116 and, in a process step 118, the simulator stores the PDU PC as a "fetch PC." Next, at step 120, the PDU fetches the instruction having a PC equal to PDU PC from RAM. Thereafter, a decision step 122 determines whether the fetched instruction is a decision control transfer instruction. If not, a step 124 sets the PDU PC equal to the next sequential PC as determined from the static program stored in RAM. If, however, the fetched op code is a DCTI, a process step 126 sets the PDU PC equal the PC of the predicted target of the DCTI as determined by a branch prediction algorithm of the processor (as accurately represented in the model of the processor).

It should be understood that in many processors considerable efficiency can be realized by predicting, at the fetch stage, which path a branch instruction will take. Thus, while the processor is executing the branch instruction, it concurrently fetches the next instruction on the predicted branch path. Of course, if it is later determined that the branch target was incorrectly predicted, all instructions in the pipeline that are younger than the DCTI must be invalidated. Branch prediction is a function of the history of the branch execution. It should also be noted that accurately modeling a processor's branch prediction algorithm and the elements affecting parameters used by the branch prediction algorithm is critical to a correct prediction of processor performance.

Figure 7A:
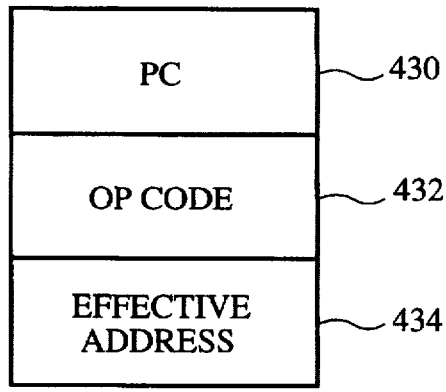
FIG. 7A is a representation of an instruction structure provided for a trace file used by a simulator of this invention.
Figure 7B:
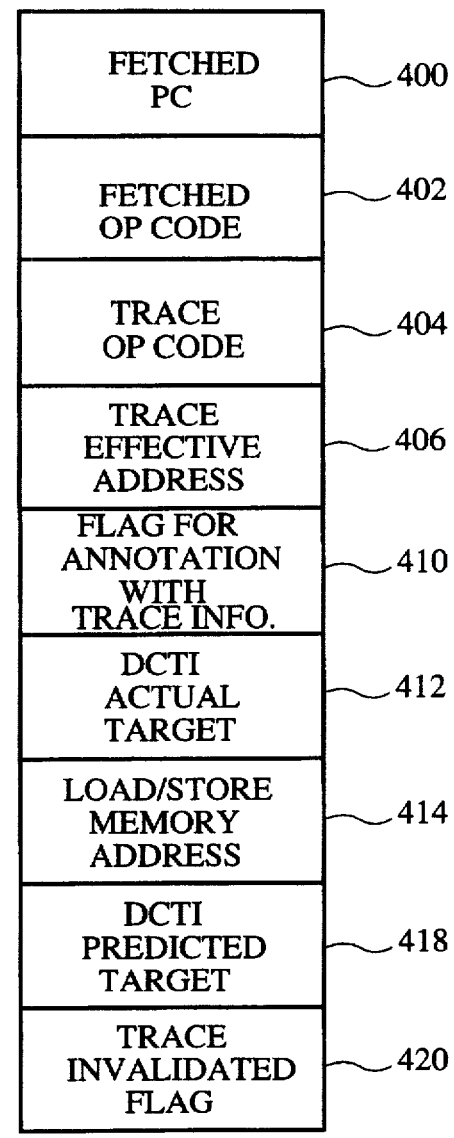
FIG. 7B is representation of an instruction structure generated by a simulator of this invention for instructions being processed.

Regardless of whether the PDU PC is set to the next sequential PC or to the predicted target of a DCTI, a step 130 next creates an instruction structure for the fetched op code. In a preferred embodiment, the instruction structure for use with this process takes the form shown in FIG. 7B. Next, a process step 132 stores the fetched op code and fetched PC in fields 402 and 400, respectively, of the instruction structure. Also at this step, the DCTI predicted target (if any) is stored in field 418 of the instruction structure. Thereafter, at a step 134, a trace invalidated flag is cleared at field 420 of instruction structure.

At this point in the process, a decision step 138 determines whether the fetched PC is equal to the trace buffer PC. It should be noted that instructions from the trace file are provided in instruction structures as shown FIG. 7A. These instruction structures include the trace instruction PC in a field 430, the trace instruction op code in field 432, and the trace instruction effective address (for LOAD/STORE and DCTI instructions) in field 434. The comparison required by decision step 138 can be made by simply determining the value in the fetched PC field 400 of the simulator instruction structure and the value in the trace PC field 430 of the trace buffer instruction structure. Assuming that the fetched PC equals the traced PC (as it must for the very first instruction handled by the process), a step 140 sets a trace annotated flag in field 410 of the simulator instruction structure. Thereafter, a process step 142 stores the trace op code and trace effective address in the simulator instruction structure in fields 404 and 406, respectively. Finally, at process step 146, the next entry from the trace file is read into trace buffer, and the process is completed at 150.

If decision step 138 is answered in the negative (i.e., the fetched PC does not equal the traced buffer PC), a process step 148 clears the trace annotated flag in field 410 of the simulator instruction structure. Thereafter, the process is completed at 150. It should be noted that the only time when the fetched PC does not equal the trace buffer PC is when (1) the PDU mispredicts a DCTI target at process step 126, or (2) an instruction traps. After the PDU mispredicts a branch path, in subsequent step, the fetched PC will not equal the trace buffer PC. It should be noted, however, that most processors include a "delay slot" after a DCTI instruction where by the next sequential program instruction is fed to the pipeline regardless of whether the processor predicts a different branch target.

Figure 6D:
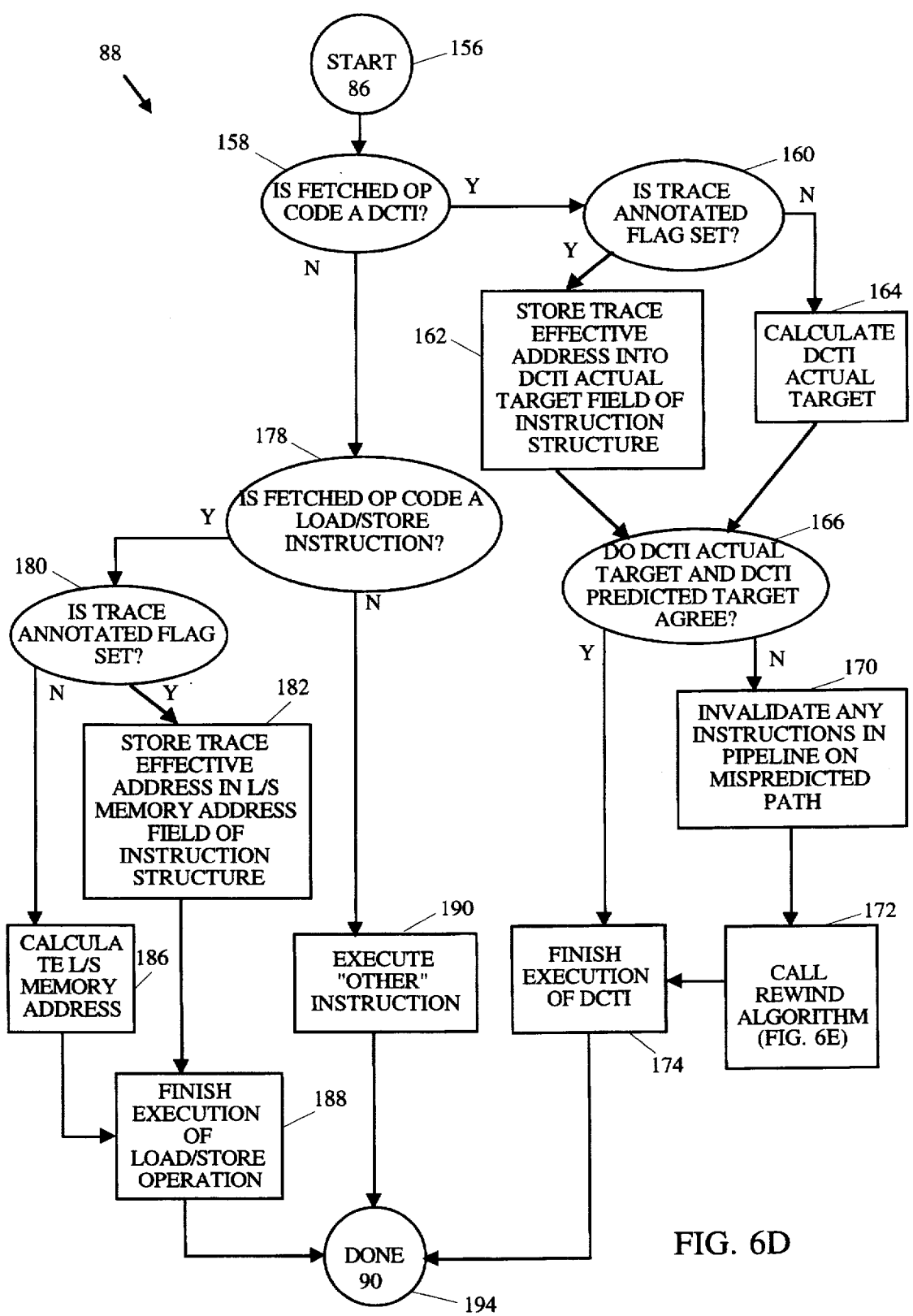
FIG. 6D is a process flow diagram detailing the step by which instructions are executed in accordance with this invention.

The details associated with executing an instruction (step 88 of FIG. 6A) are presented in FIG. 6D. The process begins at 86 and, in a decision step 158, the simulator determines whether the currently fetched op code specifies a decision control transfer instruction. If so, the simulator determines whether trace annotated flag is set at field 410 of the simulator instruction structure (step 160). If so, the simulator stores the trace effective address (field 434 of the trace buffer instruction structure) into the DCTI actual target field (field 412) of the simulator instruction structure (process step 162). Thus, when the trace annotated flag is set (i.e., when the fetched PC equals the trace buffer PC) the simulator defers to the trace instruction in determined the DCTI actual target. If, however, the trace annotated flag is not set in the instruction structure, decision step 160 is answered in the negative and the simulator calculates the DCTI actual target at step 164. The trace annotated flag would not be set because the simulator is already on an incorrectly predicted path. Regardless of whether the DCTI actual target field (field 312 of the simulator instruction structure) is filled at step 162 or 164, the simulator next determines whether the DCTI actual target and DCTI predicted target agree at a decision step 166. If not, the simulator recognizes that it is now on an incorrectly predicted path and invalidates any instructions younger than the DCTI in the processor pipeline at step 170. Thereafter, the simulator calls a rewind routine at a step 172. This routine is discussed in more detail with reference to FIG. 6E. Thereafter, any activity associated with finishing the execution of the current DCTI is conducted at a step 174. It should be noted that if decision step 166 is answered in the affirmative (i.e., the actual and predicted DCTI target agree), the simulator simply finishes execution of the DCTI at step 174. Thereafter, the process is completed at 194.

It is important that the simulator wait until the execution stage before determining whether the actual and predicted DCTI targets agree. This is because during operation an actual processor would not know it was on an incorrectly predicted path until it reached the execution stage. Thus, to accurately model the performance of the processor (i.e., the number of cycles actually expended on an incorrectly predicted path), the simulator must behave in the above described manner. It is also important that step 170 invalidate any instructions younger than the DCTI in the pipeline, as this process also effects performance. Generally, invalidation is accomplished by simply removing instructions from the pipeline. Typically each instruction handled by the processor has a bit which may be set either "valid" or "invalid." After it is determined that the instruction is invalid, the processor simply ensures that the bit is set as "invalid."

During execution, various instructions on the incorrectly predicted path may begin the process of writing to certain registers. However, in most processors, registers are written to in stages and a previous register value is not completely written over until execution is completed. Thus, until then, the previous register value is maintained and need not be rewritten to its register if a pipeline instruction is invalidated.

Assuming that decision step 158 is answered in the negative because the fetched op code is not a DCTI, a decision step 178 determines whether the fetched op code is a LOAD/STORE instruction. If so, the simulator determines whether the trace annotated flag is set at a decision step 180, and, if so, the trace effective address is stored in the LOAD/STORE memory address field (field 414) of the simulator instruction structure. Thereafter, the simulator finishes execution of the LOAD/STORE operation at a step 188 and the process is concluded at 194. If the trace annotation flag is found to be not set at decision step 180, the simulator calculates the actual LOAD/STORE memory address at step 186 as if the simulator was in execution mode (as opposed to trace driven mode). After calculating the LOAD/STORE memory address, the simulator finishes execution of the LOAD/STORE operation at step 188. It is important that the trace instruction specify the effective LOAD/STORE memory address so that the architectural state of the processor is accurately modeled. If the LOAD/STORE effective memory addresses were inaccurately set, such performance factors as the cache hit rate would not be known with accuracy.

If the fetched op code is not a LOAD/STORE instruction (and also not a DCTI), the simulator executes whatever instruction it encounters at a process step 190. The process is thereafter completed at 194. Instructions other than LOAD/STORE instructions or DCTIs are executed by the simulator as if it was in execution driven mode.

Figure 6E:
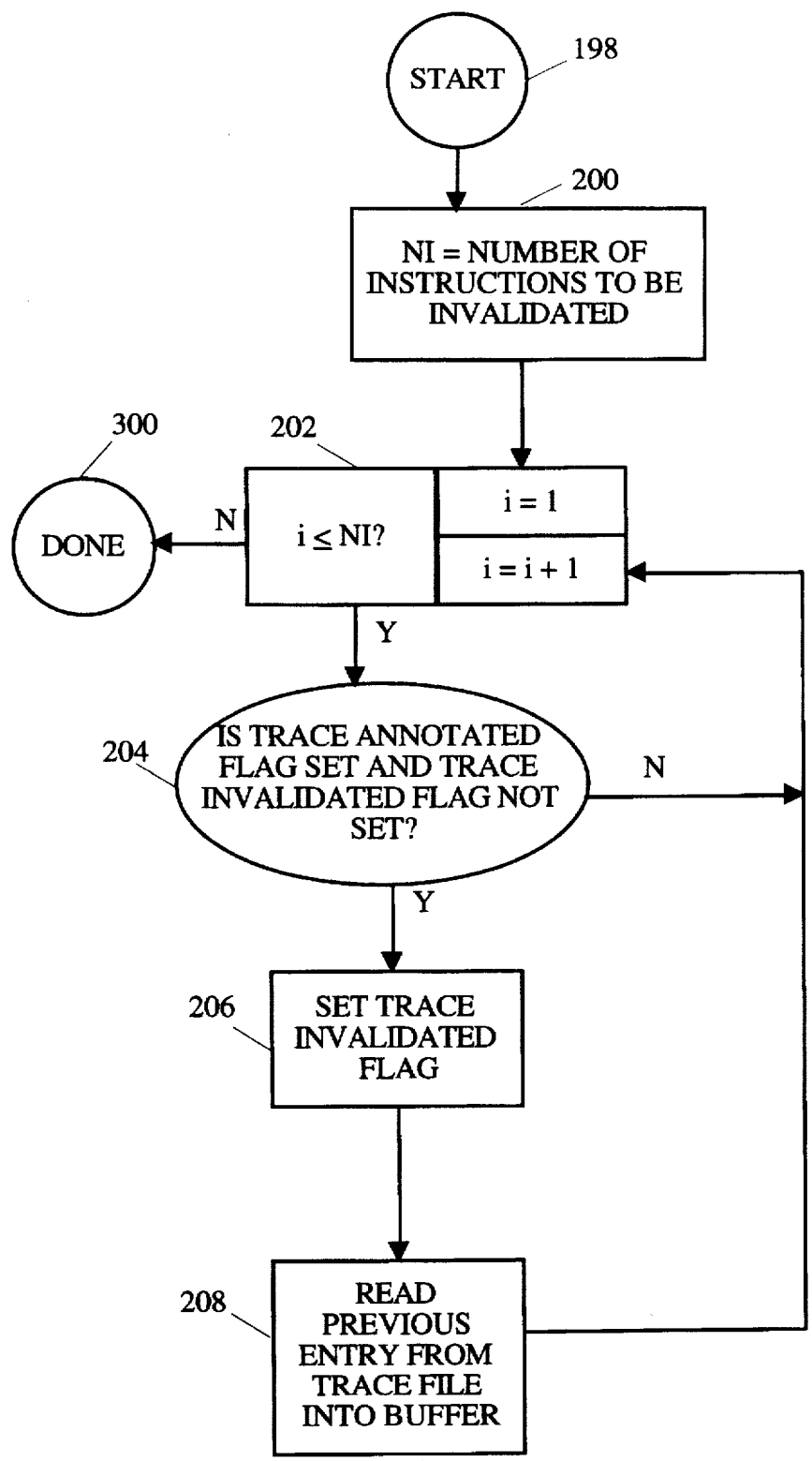
FIG. 6E is a process flow diagram showing the steps of a rewind routine used to reset a trace buffer after the simulator has determined that an incorrectly predicted path has been taken or that an instruction has trapped.
Figure 6F:
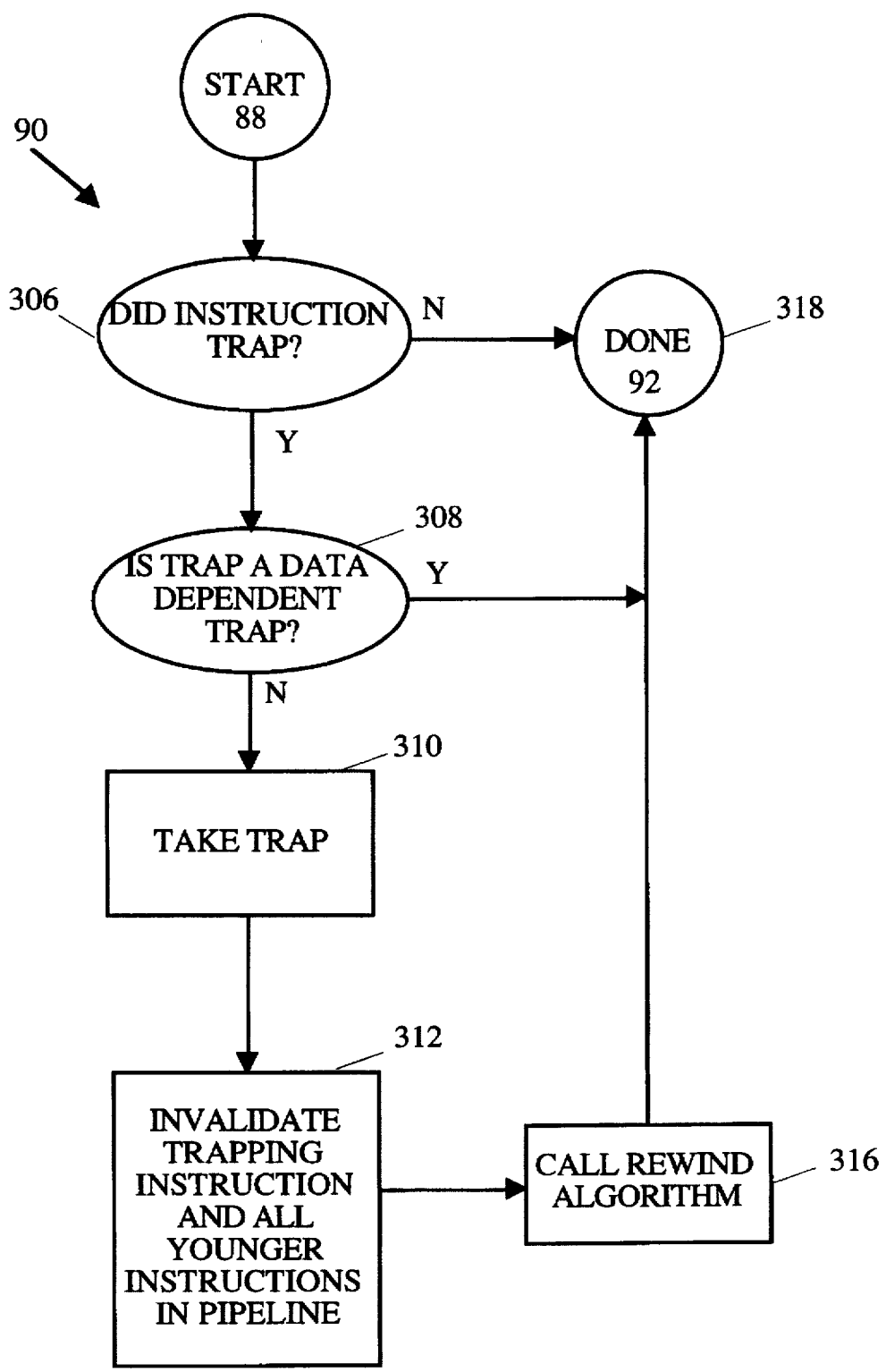
FIG. 6F is process flow diagram detailing the steps by which a simulator checks for traps in accordance with this invention.

The process of rewinding the trace buffer (step 172 of FIG. 6D) is detailed in FIG. 6E. The process begins at 198 and in a process step 200 the variable NI is set equal to the number of instructions to be invalidated. As noted above, the number of pipeline instruction to be invalidated is equal to the number of instructions that are younger than a DCTI having the incorrectly predicted branch. After process step 200, an iterative loop step 202 initializes an instruction counter "i" equal to one and then determines whether the current value of i is less than or equal to the variable NI. Assuming the that i less than NI, a decision step 204 determines (a) whether the trace annotated flag is set and (b) whether a trace invalidated flag (field 420 of simulator instruction structure) is not set. Assuming that decision step 204 is answered in the affirmative, a process step 206 sets the trace invalidated flag in the simulator instruction structure.

It should be noted at this point that instructions can be invalidated for one of two reasons. As noted, they may be invalidated because they are on an incorrectly predicted path. In addition, they may be invalidated because an instruction has trapped. This situation will be described in more detail below. The purpose of the trace invalidated flag is to ensure that an instruction is not used to rewind the trace buffer twice: once for being on an incorrectly predicted path and once for entering a trap. After the trace invalidated flag has been set at process step 206, the simulator reads the previous entry from the trace file into the trace buffer at step 208. Process control then returns to iterative loop step 202 where the instruction counter i is incremented by 1. Assuming that the current value of i is still less than the value of NI, the simulator determines whether the trace annotated flag is set and trace invalidated flag is not set for the next instruction at decision step 204. If decision step 204 is ever answered in the negative, the simulator recognizes that the rewind procedure will be performed for the current instruction at another time. Thus, when decision step 204 is answered in the negative, process control simply returns to iterative loop step 202 where the counter i is incremented by 1. Eventually, the value of i exceeds that of NI. At this point, the rewind process is completed at 300.

When the occurrence of an "exceptional event" (e.g., a page miss) in a processor results in an automatic transfer to a special routine for handling that event, this transfer is called a "trap." Whatever the event, the processor hardware automatically executes a transfer to a predefined storage location that is assigned to the particular event. That location contains an appropriate software handling routine. Normally, a computer's operating system handles such traps by requiring that various relevant operations be performed in response to a trap. Such operations include, for example, reading a page from memory or displaying an error message. In the case of a cycle accurate model, no operating system is provided. However, according to the present invention, none of the conventional operating system responses to traps need be performed. The cycle accurate model may be designed to simply issue a "done" statement in lieu of the normal operating system functions in response to a trap. The cycle accurate model then simply (1) invalidates the instructions currently in the pipeline, (2) rolls back to the trace instruction immediately following the instruction that caused the trap, and (3) refetches that instruction.

In special cases, the cycle accurate model may treat a trap somewhat differently. This is appropriate when, for example, the trap is issued in response to a request to access a virtual memory address for the first time. Normally, in computers, a trap is issued when the processor tries to access a virtual memory address for the first time. The appropriate trap handler then sends control back to the operating system which must then map the virtual address to a physical address in memory. This information is then given to the processors memory management unit which tries to access the physical address. In conventional processors, an entity known as the memory management unit handles the processor's conversion of virtual addresses to physical addresses.

In this invention, it is sufficient to have the cycle accurate model provide a special set of trap handlers that tell the memory management unit it is in trace mode. The MMU then computes an entry to provide the mapping to set the physical address equal to the virtual address. In actual computers, this function is normally performed by the operating system The general process by which a simulator of this invention may handle traps (step 90 of FIG. 6A) is detailed in FIG. 6F. The process begins at 304 and, in a decision step 306, determines whether the current instruction trapped. If not, the process is simply completed at 318. If, however, the simulator determines that the instruction did trap, it then determines whether the trap is a "data dependent" trap at decision step 308. Data dependent traps are unreliable since the simulator does not maintain the correct date for operations in trace mode. An example of a data dependent trap is division by zero. Assuming that the trap is in fact a data dependent trap, the process is completed at 318 (i.e., the trap is ignored). If, however, the trap in not a data dependent trap (e.g., a system call), the processor takes the trap at step 310 as described above. Thereafter, the simulator invalidates the trapping instruction and all younger in the pipeline at a step 312. The process by which such instructions are invalidated is identical to that described in connection with invalidation of instructions on an incorrectly predicted path. After process step 312, a step 316 calls a rewind routine (as presented in FIG. 6E) and the process is completed at 318. It should be noted that in performing the rewind routine, the value of NI is set equal to the number of instructions in the pipeline that are younger than trapping instructions plus 1.

Figure 6G:
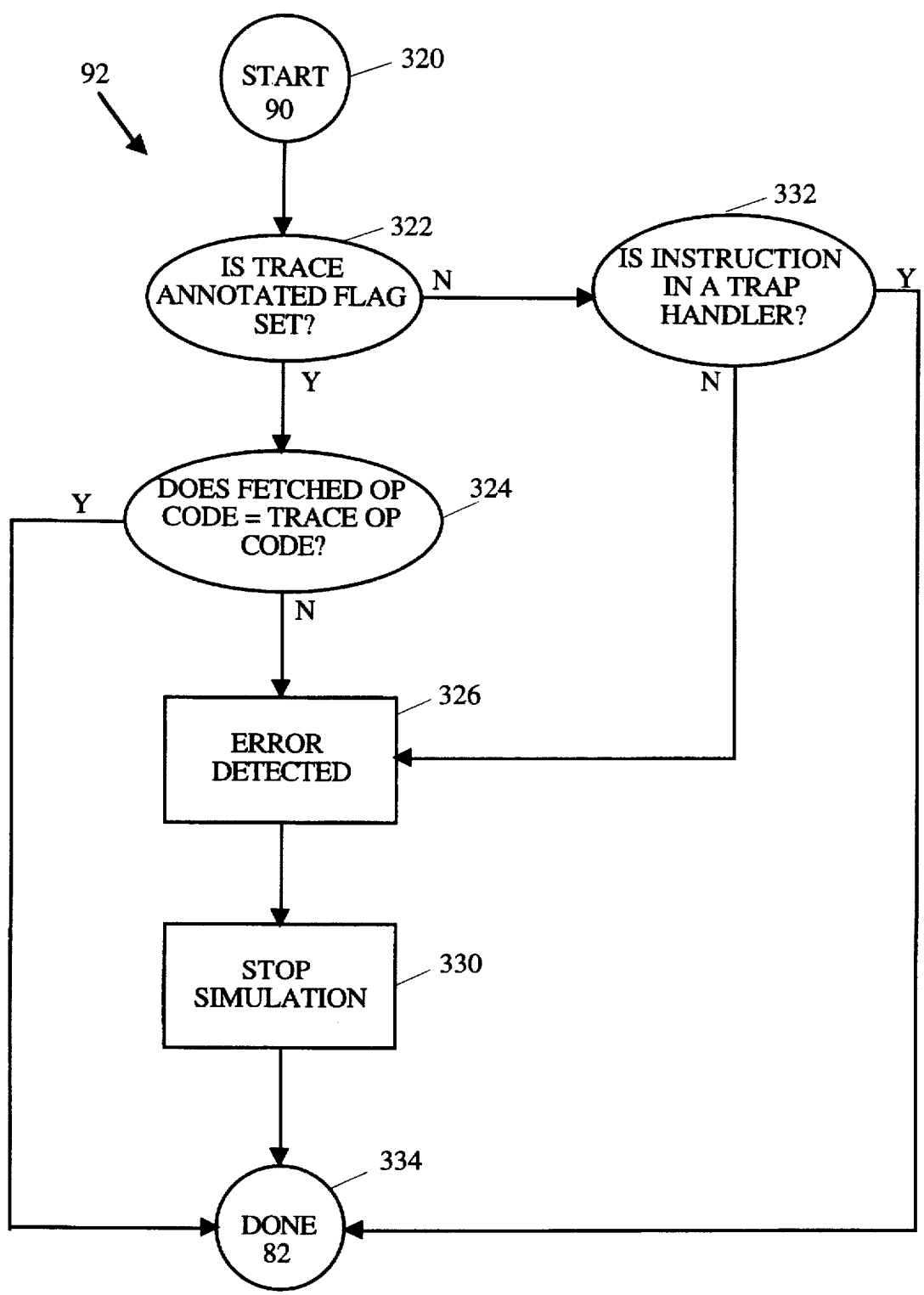
FIG. 6G is a process flow diagram detailing the steps by which a simulator does a consistency check in accordance with this invention.

The process by which the simulator does a consistency check (step 92 of FIG. A) is detailed in FIG. 6G. the process begins at 320 and, in a decision step 322, determines whether trace annotated flag is set. If so, the simulator then determines whether the fetched op code equals the trace op code at a decision step 324. If not, an error has been detected and is noted at a step 326. Thereafter, simulation is stopped at a step 330 and the process completed at 334. If decision step 324 determines that the fetched op code does indeed equal the trace op code, the process is completed at 334 without error notification or exiting. If decision step 322 is answered negative, a decision step 332 determines whether the current instruction is in a trap handler. If so, the simulator determines that there is not a problem and simply completes the process at 334. However, if step 332 is answered in the negative, a problem has been detected and the process proceeds to step 326 to handle the error. Presumably, by the time an instruction reaches the consistency check, any incorrectly predicted path should have been recognized and accounted for. Therefore, the trace annotated flag should be set unless the instruction is a trap handler.

Although the foregoing invention has been described in some detail for purposes of clarity of understanding, it will be apparent that certain changes and modifications may be practiced within the scope of the appended claims. For instance, although the specification has focused on a SPARC superscalar processor design, other designs may be simulated as well. For example, CISC processor designs and processors employing conventional pipelining may also be simulated. In addition, the reader will understand that the simulators described herein can be used to predict performance of systems other than general purpose microprocessors. For example, the simulators here taught may generally be used with any synchronous logic design.

What is claimed is:

1. A system for predicting the performance or a processor design when running a sequence of program instructions, the system comprising:

a processor model of the processor capable of executing said sequence of program instructions;

a memory model accessible by the processor model for storing a static version of said sequence of program instructions which can be executed on the processor model; and a trace file available for inputting into a trace buffer as a plurality of trace file instructions, at least some of which contain effective addresses for defined classes of instructions, wherein the processor model is capable of concurrently processing corresponding instructions from the trace buffer and from a static version of said sequence of program instructions, and wherein the processor model uses the trace file instructions to determine the effective addresses of said defined classes of instructions to assist execution of the static version.

2. The system of claim 1 wherein the processor includes software objects suited to perform central processing unit functions.

3. The system of claim 2 wherein the software objects include one or more of the following: a prefetch and dispatch unit, an integer execution unit accessible by said trace buffer, a load/store unit, and an external cache unit accessible by said memory model.

4. The system of claim 1 wherein the effective addresses for said defined classes of instructions include branch targets for decision control transfer instructions (DCTIs) and effective memory addresses for memory access instructions.

5. The system of claim 1 further comprising an execution tool for executing said sequence of program instructions to generate a trace of the executed instructions.

6. The system of claim 5 further comprising a sampler which divides the trace generated by said execution tool into blocks of contiguous trace instructions of a size that is substantially smaller than the total size of the trace.

7. The system of claim 1 wherein the processor model is arranged such that it pipelines instructions through stages that include at least a fetch stage, a decode stage, and an execute stage.

8. The system of claim 7 wherein the processor model pipelines instructions according a superscalar processor design such that multiple instructions can be processed at a single stage in a single clock cycle.

9. The system of claim 1 wherein the processor model further comprises an instruction structure generator which generates, for each program instruction, an instruction structure containing a program counter for the static version of the program instruction, a program counter for the trace file instruction, and flag indicating whether the instruction structure is annotated with an effective address from the trace file instruction.

10. The system of claim 1 wherein the processor model can be operated in an execution driven mode in which the effective addresses in the trace file instructions are not employed by the processor model to determine effective addresses.

11. The system of claim 1 wherein said processor design is provided as a hardware design language representation of the processor.

12. A computer implemented method for providing performance criteria for a processor design with the aid of a processor model, the method comprising the following steps:

providing a segment of a trace file for a program which was previously executed to generate the trace file, the trace file being accessible to the processor model and including the effective addresses of certain classes of instructions;

providing a static version of the program in a model of a main memory accessible to the processor model; and concurrently processing, in the processor model, instructions from the segment of the trace file and from the static version of the program, such that the processor model determines at least some effective addresses from the segment of the trace file without itself calculating said effective addresses.

13. The method of claim 12 wherein each instruction in the segment of the trace file and each instruction in the static version of the program includes a program counter and wherein the method further comprises the following steps:

comparing the static and trace file program counters for each successive instruction; and when the static and trace file program counters agree and when the instruction is one of said certain classes of instructions, annotating an instruction structure with the effective address specified by the trace file segment.

14. The method of claim 13 wherein the classes of instruction for which the trace file provides effective addresses include memory access and decision control transfer instructions (DCTIs), and wherein the effective addresses for memory access instructions are memory addresses and the effective addresses for DCTIs are branch targets.

15. The method of claim 14 further comprising the following steps each time a DCTI is encountered:

predicting a branch target according to a branch prediction algorithm of the processor design;

comparing the predicted branch target with an actual branch target to determine if the processor model has taken an incorrectly predicted path; and if the actual and predicted branch targets do not agree, invalidating instructions on said incorrectly predicted path.

16. The method of claim 15 wherein the actual branch target is determined from the trace file segment for at least one DCTI.

17. The method of claim 12 wherein the step of providing a segment of a trace file for a sequence of program instructions includes the following steps:

running the entire program to generate the trace file including the effective addresses of certain classes of instruction; and sampling the trace file to provide segments of contiguous trace instructions for use by the processor model.

18. The method of claim 12 wherein the program is a benchmark program provided to measure processor performance.

19. The method of claim 12 further comprising a step of determining and outputting performance statistics for the microprocessor design.

20. The method of claim 19 wherein the performance statistics include at least one statistic selected from the group consisting of number of cycles required to execute a trace, the average number of cycles per instructions, and the cache hit rate.

21. The method of claim 12 further comprising a step of checking for traps and, if a trap meeting defined criteria is found, invalidating the trap instruction and one or more other instructions following the trap instruction in a pipeline of the processor design.

22. The method of claim 12 wherein the processor model uses the trace file to assist in the execution of the static version.

* * * * *

UNITED STATES PATENT AND TRADEMARK OFFICE
CERTIFICATE OF CORRECTION

PATENT NO. : 5,615,357
DATED : March 25, 1997
INVENTOR(S) : Loran P. Ball

It is certified that error appears in the above-indentified patent and that said Letters Patent is hereby corrected as shown below:

Column 9, line 3, change "Of" to --Of--

CLAIMS:

Column 15, line 50, change "or" to --of--

Signed and Sealed this

Second Day of September, 1997

BRUCE LEHMAN

*Attest:*

*Attesting Officer*     *Commissioner of Patents and Trademarks*